United States Patent
Reinhardt

[15] 3,695,709
[45] Oct. 3, 1972

[54] DUMP VEHICLE
[72] Inventor: Robert L. Reinhardt, Lubbock, Tex.
[73] Assignee: Clark Equipment Company
[22] Filed: Oct. 15, 1970
[21] Appl. No.: 80,867

[52] U.S. Cl. .......................298/9, 298/14, 298/17.5, 298/22 D
[51] Int. Cl. .............................................B60p 1/30
[58] Field of Search....................298/9, 12–16, 17.5, 298/22 R, 22 D; 214/146.5

[56] References Cited

UNITED STATES PATENTS

| | | | |
|---|---|---|---|
| 3,049,378 | 8/1962 | Nelson | 298/14 |
| 2,174,956 | 10/1939 | Allison | 298/9 |

*Primary Examiner*—Robert G. Sheridan
*Attorney*—Kenneth C. Witt, John C. Wiessler, Robert H. Johnson and Lewis J. Lamm

[57] ABSTRACT

A lifting mechanism for use with a vehicle adapted to transport and discharge material. The mechanism provides means for raising the elevatable end of the vehicle dump body a distance sufficient for clean dumping and for shifting the body in a selected direction relative to the vehicle so that there is a reduced tendency for the vehicle to overturn during material discharge. The mechanism comprises a first linear actuator pivotally connected at one end to the elevatable end of the dump body and an expandable truss structure connected between the vehicle frame and the other end of the first actuator. The truss structure includes a second linear actuator pivotally connected between the vehicle frame and the other end of the first actuator, and a link pivotally connected at one end to the frame at a point forward of the second actuator and connected at the other end to the other end of the first actuator.

10 Claims, 5 Drawing Figures

INVENTOR
ROBERT L. REINHARDT
BY Kenneth C. Witt
ATTORNEY

INVENTOR
ROBERT L. REINHARDT
BY
Kenneth C. Witt
ATTORNEY

DUMP VEHICLE

BACKGROUND OF THE INVENTION

This invention relates to lifting mechanisms for vehicles used to transport material from a loading area to a dumping area and adapted to discharge the material upon arrival at the dumping area. One type of such vehicle comprises a dump body carried upon a vehicle chassis and hinged at the rearward or discharge end thereof so that the forward or elevatable end of the dump body may be raised by a lifting mechanism for the gravitational discharge of material to the rear of the vehicle. Such vehicles may also comprise a turntable adapted to pivotally support the dump body above the vehicle chassis so that its discharge end may be rotated to either the right or left side of the vehicle and the material discharged in the usual manner as the vehicle moves along the side of an area to be worked, either alone or in convoy with a number of similar vehicles. One type of lifting mechanism commonly used to effect such material discharge comprises linear actuators connected between the vehicle chassis frame and the dump body which are adapted to raise the elevatable end of the dump body when the actuator is selectively extended. Such actuators are usually orientated to operate through a substantial angle, being nearly horizontal at the beginning of dump body lifting and moving toward the vertical as the elevatable end of the dump body is raised. Because it is necessary to raise such elevatable end a substantial distance above the discharge end of the dump body to insure complete dumping of the material contained therein, and because the actuators must provide a sufficient vertical force component to overcome the fully loaded gravitational force of the material, the commonly used lifting mechanism comprises a rather expensive and complex actuator capable of substantial force exertion and substantial length extension. The horizontal force component exerted by such lifting mechanism must be counteracted by the hinging structure at the discharge end of the dump body, usually requiring the structure to withstand undue shearing forces. Further, in side dumping vehicles the center of gravity of the material contained in the dump body may shift beyond the wheel base of the vehicle during dumping so that there is a tendency for the truck to overturn toward the side of material discharge.

A principal object of my invention is to provide an improved lifting mechanism for vehicles adapted to transport and discharge material. The lifting mechanism I provide is adapted to raise the elevatable end of the dump body a distance sufficient for clean dumping of the material contained therein while exerting minimal shear forces upon the structure hinging the discharge end of the dump body. The lifting mechanism I provide is further adapted to shift the dump body in a selected direction so that there is a reduced tendency for the vehicle to overturn during side dumping.

SUMMARY OF THE INVENTION

In carrying out my invention in one preferred form thereof, I provide a lifting mechanism for raising the elevatable end of a load carrying portion above the frame of a vehicle and for shifting the load carrying portion in a selected direction relative to the frame. The mechanism comprises a first extensible linear actuator operatively connected at one end thereof to the elevatable end of the load carrying portion and an expandable truss structure connected between the frame and the other end of the first linear actuator. The truss structure includes a second extensible linear actuator and a link, the second actuator being pivotally connected at one end thereof to the frame and at the other end thereof to the other end of the first actuator, and the link being pivotally connected at one end thereof to the frame and at the other end thereof to the other ends of the first and second actuators.

DESCRIPTION OF PREFERRED EMBODIMENT

Figure 1:
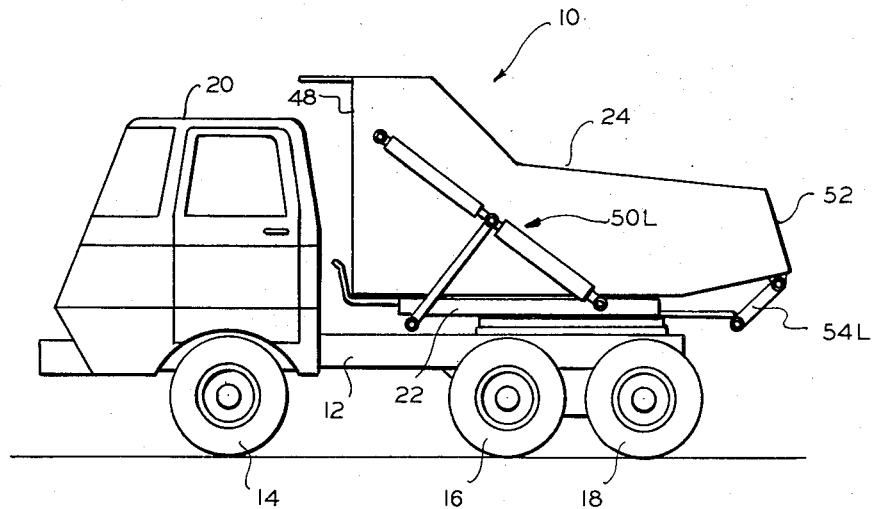
FIG. 1 is a side elevation view of a vehicle embodying this invention.
Figure 2:
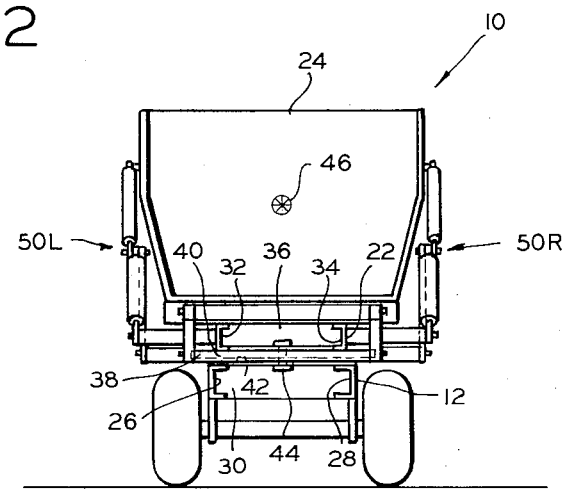
FIG. 2 is a view from the rear of the vehicle shown in FIG. 1 with portions in phantom, and illustrating the load carrying portion in the longitudinally aligned transport position.

Referring to FIG. 1 of the drawing, a motor vehicle embodying this invention is indicated generally by the numeral 10. Vehicle 10 has a chassis frame 12 supported by front pairs of ground engaging wheels 14 and rear pairs of tandem ground engaging wheels 16 and 18. A driver's cab or compartment 20 is carried by frame 12 at the front end thereof and a supplemental frame indicated as a whole by the numeral 22 is pivotally supported upon chassis frame 12 at the rearward end thereof to support an elevatable load carrying portion or dump body 24 above the chassis frame. Referring to FIG. 2, chassis frame 12 includes the usual longitudinal members 26 and 28 that are interconnected by a suitable number of transverse members, such as member 30, to form a horizontally disposed frame structure. Supplemental frame 22 comprises longitudinal members 32 and 34 that are interconnected by a suitable number of transverse members, such as member 36, and is supported upon chassis frame 12 through a turntable 38 of common design so that dump body 24 may be rotated through a selected angle either clockwise or counterclockwise in a plane parallel to frame 12 by known power means (not shown) for the side dumping of material contained in the dump body either to the right or the left side of vehicle 10. Turntable 38 comprises a circular plate 40 connected below supplemental frame 22 that is adapted to bear upon a circular plate 42 connected above chassis frame 12 for the pivotal support of the supplemental frame above the chassis frame about a king pin 44 passing through aligned bores central to both plate 42 and plate 40. King pin 44 defines the pivotal center of supplemental frame 22 and dump body 24 about chassis frame 12 and is located to place such pivotal center directly and vertically beneath the centroid indicated at 46 of the dump body while the dump body is in the unraised positions shown in FIGS. 1 through 3, thereby balancing forces that may urge the vehicle to overturn when the supplemental frame is pivoted either clockwise or counterclockwise for side dumping.

Figure 3:
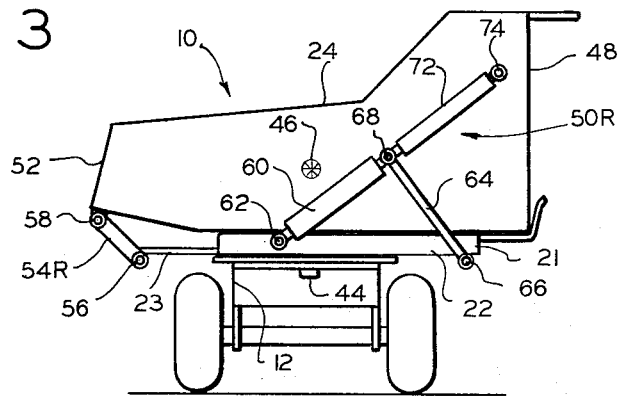
FIG. 3 is a view similar to FIG. 2 showing the load carrying portion rotated to the transverse position preparatory to dumping of material to the left side of the vehicle.

Referring to FIG. 3, dump body 24 and supplemental frame 22 are shown in a position preparatory to the dumping of material contained in the dump body to the left side of vehicle 10. Supplemental frame 22 and dump body 24 may also be rotated for dumping of material to the right side of vehicle 10 and the operation of the apparatus as hereinafter explained is similarly applicable to such dumping right. The elevatable end 48 of dump body 24 is connected to, and supported above the normally forward end 21 of supplemental frame 22 by lifting mechanisms that comprise a system of mechanical links and extensible linear actuators, one such lifting mechanism located on either side of the supplemental frame as indicated generally by the numerals 50R (FIG. 3) and 50L (FIG. 1). The discharge end 52 of dump body 24 is supported above the normally rearward end 23 of supplemental frame 22 by a hinging structure comprising allochirally related hinging links 54R (FIG. 3) and 54L (FIG. 1) that are pivotally connected at one end to rearward end 23 of the supplemental frame by the pin 56 and at the other end to discharge end 52 of the dump body by the pin 58. Lifting mechanism 50R comprises an extensible linear actuator 60 pivotally connected at one end to supplemental frame 22 through a pin 62, and a link 64 pivotally connected at one end to supplemental frame 22 through a pin 66 located nearer forward end 21 and elevatable end 48 than the location of pin 62. The other end of link 64 is pivotally connected to the free end of actuator 60 through the pin 68 so that a triangular truss structure is formed that may be expanded by the selected extension of actuator 60. Lifting mechanism 50R also comprises another extensible linear actuator 72 that is pivotally connected to the truss structure at pin 68 and to elevatable end 48 of the dump body through pin 74 to support and raise the dump body. The aforementioned extensible linear actuators are preferably hydraulic cylinder mechanisms with actuators 60R-60L and actuators 72R-72L connected, respectively, to operate in parallel and to be selectively extended by any suitable control means.

Figure 4:
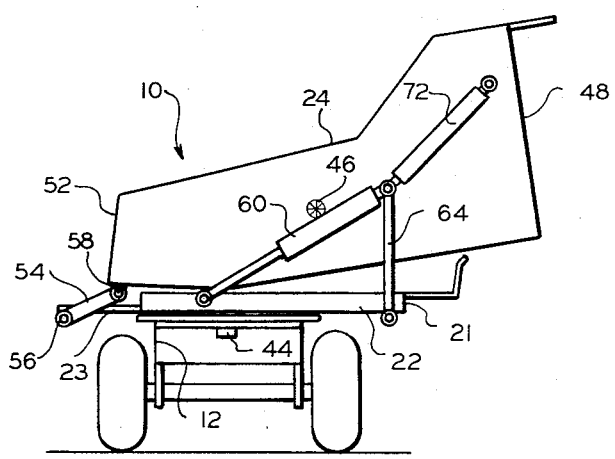
FIG. 4 is a view similar to FIG. 3 showing the load carrying portion in an intermediate position to illustrate the shift of the load carrying portion relative to the frame and to illustrate the intermediate position of the lifting mechanism.
Figure 5:
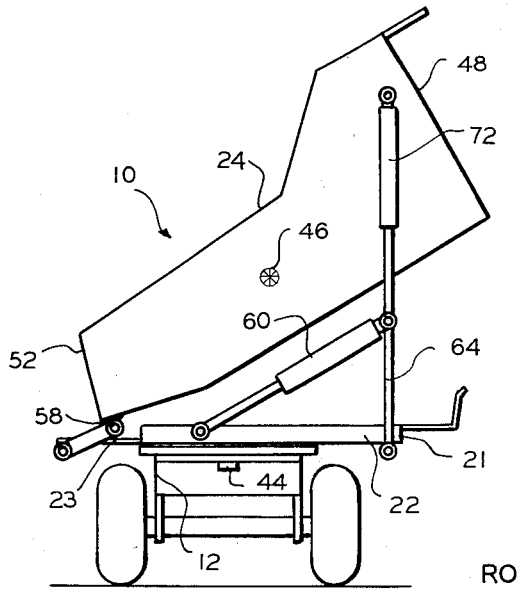
FIG. 5 is a view similar to FIG. 3 showing the load carrying portion in the fully elevated, or material discharge position.

In operation, material contained in dump body 24 is transported by vehicle 10 from a loading area to a dumping area with the supplemental frame and dump body in the longitudinally aligned transport position shown in FIG. 1. Upon arrival at the dumping area, and assuming that it is desired to dump the material to the left side of the vehicle, the power means for turntable 38 is activated to rotate the supplemental frame and dump body upon the turntable to the transverse position, preparatory to dumping left shown in FIG. 3. During rotation to the transverse position the centroid 46 remains directly above king pin 44 so that the vehicle is not urged to overturn as a result of such rotation. When it is desired to discharge the material contained in the dump body, actuators 60R and 60L are first extended by the operator to expand the triangular truss structure to the intermediate position shown in FIG. 4, thereby pivoting actuators 72 toward a vertical position for a more vertical exertion of forces in raising the elevatable end of the dump body during material discharge. During expansion of the truss structure the shifting movement of dump body 24 relative to supplemental frame 22 is defined by links 54 and 64 so that centroid 46 is shifted in the direction of elevatable end 48 of the dump body and away from the side of the vehicle to which it is intended to discharge material, as indicated in FIG. 4. Such a shift in the location of centroid 46 partially counteracts the vehicle overturning moment resulting from the movement of the center of gravity of the material contained in the dump body toward the discharge end 52 when the elevatable end 48 is raised. Links 64 support a portion of the fully loaded weight of dump body 24 so that the strength of actuators 60 need only be sufficient to expand the truss structure. As dump body 24 is shifted to the intermediate position the hinging structure comprising links 54 and pins 56 and 58 merely guide and support the discharge end of the dump body so that the structure is not required to withstand the horizontal force component exerted by actuators 60 and the shear forces exerted upon this structure are minimized. Finally, as shown in FIG. 5, actuators 72 are extended to raise elevatable end 48 and pivot dump body 24 about the transverse hinging axis defined by pins 58 of the hinging structure, thereby urging the material contained in the dump body to discharge by gravitational forces to the left side of the vehicle.

While I have described and illustrated herein a preferred embodiment of my invention, incorporated in one type of vehicle, it will be understood to those skilled in the art that my invention may be incorporated in a variety of vehicles and that other embodiments and modifications of the invention may be made, as by providing a common track and roller structure to guide and support the discharge end of the dump body instead of the hinging structure herein disclosed. It should be understood, therefore, that I intend to cover by the appended claims all modifications and variations which fall within the true spirit and scope of my invention.

I claim:

1. A vehicle adapted to transport and discharge material comprising a horizontally disposed frame,
    a load carrying portion supported above said frame and having an elevatable end and a discharge end,
    a first extensible linear actuator operatively connected at one end thereof to said elevatable end,
    a second extensible linear actuator pivotally connected at one end thereof to said frame and at the other end thereof to the other end of said first actuator,
    a link pivotally connected at one end thereof to said frame and pivotally connected at the other end thereof to said other ends of said first actuator and said second actuator, said link being pivotally connected to said frame at a point nearer said elevatable end of said load carrying portion than the point at which said second actuator is pivotally connected to said frame so that said link pivots between a diagonally rearwardly inclined position and a substantially vertical position when said second actuator is extended.

2. A vehicle according to claim 1, also comprising
a hinging structure defining the transverse axis about which said elevatable end may be elevated relative to said frame and supporting said discharge end when said portion shifts relative to said frame.

3. A vehicle according to claim 2, wherein said hinging structure includes a hinging link pivotally connected at a first end thereof to said discharge end of said load carrying portion and pivotally connected at a second end thereof to the rearward end of said frame, said pivotal connection at said first end defining said transverse axis, said hinging link being pivotal about said second end between a diagonally rearwardly inclined position and a diagonally forwardly inclined position.

4. A vehicle according to claim 3, comprising a chassis frame and turntable means, said turntable means supporting said frame above said chassis frame and defining a pivotal center, said pivotal center located directly and vertically beneath the centroid of said load carrying portion when said elevatable end is not elevated and said frame being rotatable through a selected angle about said pivotal center either clockwise or counterclockwise relative to said chassis frame.

5. A dump vehicle having a dump body comprising
a vehicle frame,
means supporting the dump body on the vehicle frame enabling it to be tilted relative to the frame for discharging a load from one end, said means including linkage means connecting the dump body to the frame for tilting and also for shifting movement relative to the frame on spaced, parallel, transverse pivot axes, one pivot axis passing through the dump body and moving in a forward and upward arc about the other pivot axis so as to effect the shifting movement of the dump body in a direction away from the discharge and simultaneously with the tilting of the dump body whereby a corresponding shift in the center of the load relative to said frame occurs tending to stabilize the vehicle during dumping operations.

6. A dump vehicle according to claim 5 wherein said linkage means includes
a pair of rigid links, one on each side of the dump body, each having a lower end pivotally connected to the vehicle frame below the dump body and inclining rearwardly with the opposite ends of each link pivoting on said one transverse pivot axis.

7. A dump according to claim 6, including
a first pair of hydraulic cylinders, one on each of the dump body and each pivotally mounted at the lower end to said vehicle frame and inclined forwardly for pivotal connection on said one transverse pivot axis whereby extension of said hydraulic cylinders will move said pair of links toward a vertical position.

8. A dump vehicle according to claim 7, including
a second pair of hydraulic cylinders, one on each side of the dump body, each having its lower end pivotally mounted on said one transverse pivot axis and inclining forwardly with the upper end being pivoted on another transverse pivot axis passing through said dump body.

9. A dump vehicle according to claim 8, wherein said dump body is pivotally mounted on said last mentioned transverse pivot axis.

10. A dump vehicle according to claim 9 including a second pair of links pivotally connected between said frame and dump body rearwardly of said other pair of links and inclining rearwardly in the lowered position of said dump body.

* * * * *

UNITED STATES PATENT OFFICE
CERTIFICATE OF CORRECTION

Patent No. 3,695,709            Dated October 3, 1972

Inventor(s) Robert L. Reinhardt

It is certified that error appears in the above-identified patent and that said Letters Patent are hereby corrected as shown below:

Column 6, line 14, after "dump" insert -- vehicle --

Column 6, line 15, after "each" insert -- side --

Signed and sealed this 17th day of April 1973.

(SEAL)
Attest:

EDWARD M. FLETCHER, JR.             ROBERT GOTTSCHALK
Attesting Officer                     Commissioner of Patents